(12) United States Patent
Kim et al.

(10) Patent No.: US 8,987,942 B2
(45) Date of Patent: Mar. 24, 2015

(54) WIRELESS POWER TRANSMITTER AND METHOD THAT TRANSMITS RESONANCE POWER USING MULTIPLE BANDS

(75) Inventors: Dong Zo Kim, Yongin-si (KR); Sang Wook Kwon, Seongnam-si (KR); Yun Kwon Park, Dongducheon-si (KR); Eun Seok Park, Suwon-si (KR); Young Tack Hong, Seongnam-si (KR); Young Ho Ryu, Yougin-si (KR); Nam Yun Kim, Seoul (KR); Jin Sung Choi, Gimpo-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 700 days.

(21) Appl. No.: 13/218,897

(22) Filed: Aug. 26, 2011

(65) Prior Publication Data

US 2012/0049647 A1 Mar. 1, 2012

(30) Foreign Application Priority Data

Aug. 26, 2010 (KR) .................. 10-2010-0082845

(51) Int. Cl.
*H01F 27/42* (2006.01)
*H02J 5/00* (2006.01)
(52) U.S. Cl.
CPC ..................................... *H02J 5/005* (2013.01)
USPC ........................................................ 307/104
(58) Field of Classification Search
USPC ........................................................ 307/104
See application file for complete search history.

(56) References Cited

U.S. PATENT DOCUMENTS

| 7,084,605 | B2 | 8/2006 | Mickle et al. | |
| 8,111,042 | B2 * | 2/2012 | Bennett | 320/108 |
| 2009/0152954 | A1 | 6/2009 | Le et al. | |
| 2011/0115432 | A1 * | 5/2011 | El-Maleh et al. | 320/108 |
| 2014/0117772 | A1 * | 5/2014 | Karaoguz et al. | 307/104 |

FOREIGN PATENT DOCUMENTS

| JP | 11-069667 | 3/1999 |
| JP | 2001-309579 | 11/2001 |
| JP | 2002-152997 | 5/2002 |
| JP | 2003-284264 | 10/2003 |
| JP | 2009-081947 | 4/2009 |
| KR | 10-2009-0056546 A | 6/2009 |
| WO | WO-2009/140221 A2 | 11/2009 |
| WO | WO-2010/093965 A2 | 8/2010 |

OTHER PUBLICATIONS

International Search Report mailed Apr. 4, 2012, directed to counterpart International Patent Application No. PCT/KR2011/006230; 4 pages.

* cited by examiner

*Primary Examiner* — Robert L. Deberadinis
(74) *Attorney, Agent, or Firm* — NSIP Law

(57) ABSTRACT

A wireless power transmitter that transmits a resonance power via a multi-band resonator and a method thereof are provided. According to an aspect, a wireless power transmitter may include: a source unit configured to generate resonance power; a power amplifying unit configured to amplify the resonance power; and a multi-band resonance unit including at least two resonators, the at least two resonators configured to transmit the amplified resonance power to target resonators using different resonance bands.

15 Claims, 16 Drawing Sheets

800

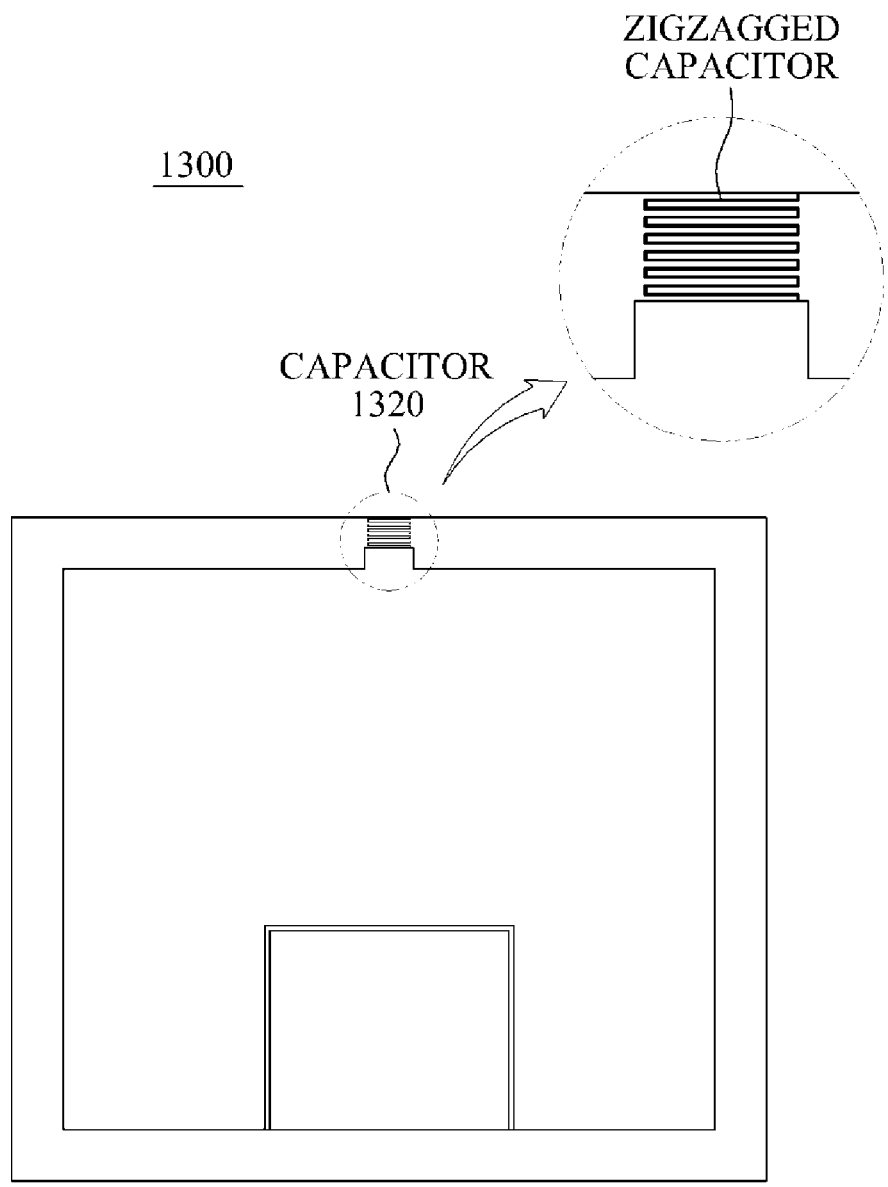

WIRELESS POWER TRANSMITTER AND METHOD THAT TRANSMITS RESONANCE POWER USING MULTIPLE BANDS

CROSS-REFERENCE TO RELATED APPLICATION(S)

This application claims the benefit under 35 U.S.C. §119(a) of Korean Patent Application No. 10-2010-0082845, filed on Aug. 26, 2010, in the Korean Intellectual Property Office, the entire disclosure of which is incorporated herein by reference for all purposes.

BACKGROUND

1. Field

The following description relates to a wireless power transmission.

2. Description of Related Art

A resonance power transferring system is a type of wireless power transmission system, and may include a source device that transmits the resonance power and a target device that receives the resonance power. One wireless power transmission system may simultaneously transmit, using a single source device, a resonance power to a plurality of target devices. However, when the resonance power is simultaneously transmitted to a plurality of target devices resonating in the same frequency, and a distance between the plurality of targets are less than or equal to a predetermined distance, coupling may occur due to a change in impedance. Thus, the resonant frequency may vary. Accordingly, the transmission efficiency of the resonance power may decrease to less than 20-30%.

SUMMARY

According to an aspect, a wireless power transmitter may include: a source unit configured to generate resonance power; a power amplifying unit configured to amplify the resonance power; and a multi-band resonance unit including at least two resonators, the at least two resonators configured to transmit the amplified resonance power to target resonators using different resonance bands.

The power amplifying unit may be configured to amplify the resonance power to a fundamental resonance power of a fundamental band, and to transmit, to the multi-band resonance unit, the fundamental resonance power and a harmonic resonance power, generated during the amplification, that is associated with at least one harmonic band, and the multi-band resonance unit may include a fundamental resonator that is configured to transmit the fundamental resonance power to a first target resonator, and at least one harmonic resonator that is configured to transmit the harmonic resonance power to a second target resonator.

The harmonic resonance power may be generated when the resonance power passes through the power amplifying unit that is a non-linear element.

The harmonic resonance power may have lower power than the fundamental resonance power.

The multi-band resonance unit may include a fundamental resonator configured as a loop that transmits a fundamental resonance power of a fundamental band to a first target resonator, and at least one harmonic resonator configured as a loop that transmits a harmonic resonance power of a harmonic band to a second target resonator.

The source unit may be configured to receive energy to generate the resonance power.

According to another aspect, a method of transmitting a multi-band resonance power in a wireless power transmitter may include: generating resonance power; amplifying the resonance power; and transmitting, to target resonators, the amplified resonance power using different resonance bands.

The amplifying may include generating a fundamental resonance power of a fundamental band by amplifying the resonance power, and a harmonic resonance power, generated during the amplification, that is associated with least one harmonic band; and The transmitting may include transmitting, using a fundamental resonator, the fundamental resonance power to a first target resonator, and transmitting, using a harmonic resonator, the harmonic resonance power to a second target resonator.

The harmonic resonance power may be generated when the resonance power passes through a power amplifying unit that is a non-linear element.

The harmonic resonance power may have lower power than the fundamental resonance power.

The method may further include receiving energy to generate the resonance power.

According to a further aspect, a wireless power transmitter may include: a plurality of resonators configured to transmit resonance power to a plurality of target resonators using different resonance bands.

The wireless power transmitter may further include: an amplifier configured to amplify the resonance power.

The amplifier may be configured to generate fundamental resonance power and harmonic resonance power.

The harmonic resonance power may have lower power than the fundamental resonance power.

The plurality of resonators may include a fundamental resonator that is configured to transmit fundamental resonance power to a first target resonator, and a harmonic resonator that is configured to transmit harmonic resonance power to a second target resonator.

Other features and aspects may be apparent from the following detailed description, the drawings, and the claims.

BRIEF DESCRIPTION OF THE DRAWINGS

FIGS. 8 through 14 are diagrams illustrating various resonators.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein may be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of well-known functions and constructions may be omitted for increased clarity and conciseness.

Figure 1:
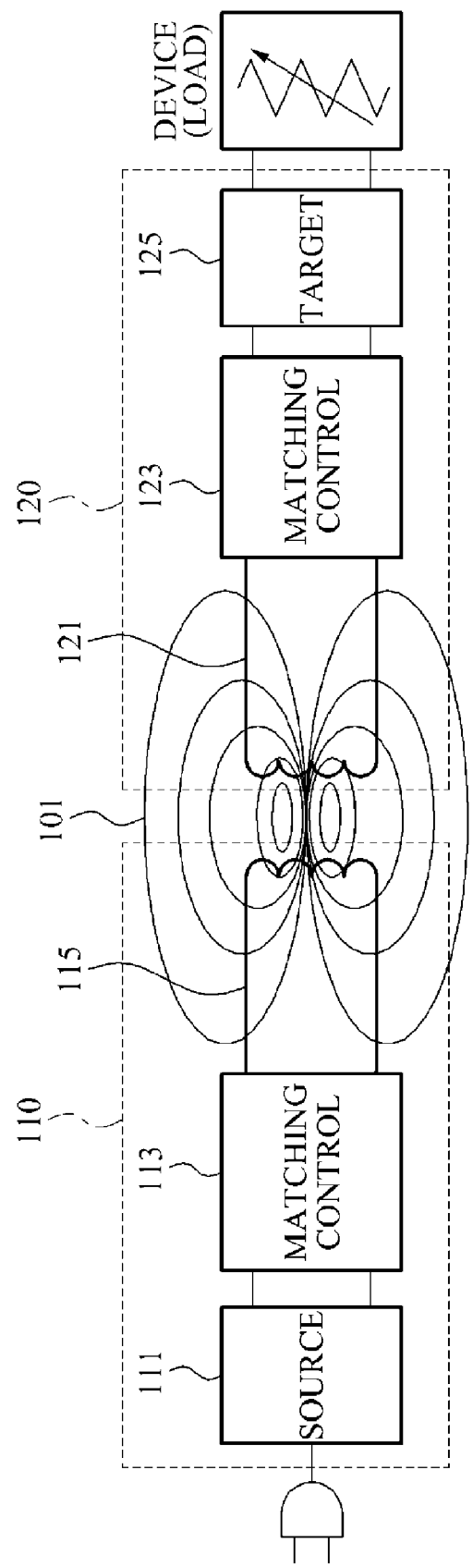
FIG. 1 is a diagram illustrating a wireless power transmission system.

FIG. 1 illustrates a wireless power transmission system that transmits resonance power using a multiple bands.

In various embodiments, the wireless power transmitted using the wireless power transmission system may be resonance power. As shown in FIG. 1, the wireless power transmission system may have a source-target structure including a source and a target. For example, the wireless power transmission system may include a resonance power transmitter 110 corresponding to the source and a resonance power receiver 120 corresponding to the target.

The resonance power transmitter 110 may include a source unit 111 and a source resonator 115. The source unit 111 may be configured to receive energy from an external voltage supplier to generate a resonance power. In some instances, the resonance power transmitter 110 may further include a matching control 113 to perform resonance frequency and/or impedance matching.

The source unit 111 may include an alternating current (AC)-to-AC (AC/AC) converter, an AC-to-direct current (DC) (AC/DC) converter, and a (DC/AC) inverter. The AC/AC converter may be configured to adjust, to a desired level, a signal level of an AC signal input from an external device. The AC/DC converter may output a DC voltage at a predetermined level, for instance, by rectifying an AC signal output from the AC/AC converter. The DC/AC inverter may be configured to generate an AC signal (e.g., in a band of a few megahertz (MHz) to tens of MHz) by quickly switching a DC voltage output from the AC/DC converter. Other frequencies of AC power are also possible.

The matching control 113 may be configured to set at least one of a resonance bandwidth of the source resonator 115 and an impedance matching frequency of the source resonator 115. In some implementations, the matching control 113 may include at least one of a source resonance bandwidth setting unit and a source matching frequency setting unit. The source resonance bandwidth setting unit may set the resonance bandwidth of the source resonator 115. And the source matching frequency setting unit may set the impedance matching frequency of the source resonator 115. For example, a Q-factor of the source resonator 115 may be determined based on setting of the resonance bandwidth of the source resonator 115 or setting of the impedance matching frequency of the source resonator 115.

The source resonator 115 may be configured to transfer electromagnetic energy to a target resonator 121. For example, the source resonator 115 may transfer the resonance power to the resonance power receiver 120 through magnetic coupling 101 with the target resonator 121. Accordingly, the source resonator 115 may be configured to resonate within the set resonance bandwidth.

As shown, the resonance power receiver 120 may include the target resonator 121, a matching control 123 to perform resonance frequency or impedance matching, and a target unit 125 to transfer the received resonance power to a device or a load.

The target resonator 121 may be configured to receive the electromagnetic energy from the source resonator 115. The target resonator 121 may be configured to resonate within the set resonance bandwidth.

The matching control 123 may set at least one of a resonance bandwidth of the target resonator 121 and an impedance matching frequency of the target resonator 121. In some instances, the matching control 123 may include a target resonance bandwidth setting unit, a target matching frequency setting unit, or both. The target resonance bandwidth setting unit may set the resonance bandwidth of the target resonator 121. The target matching frequency setting unit may set the impedance matching frequency of the target resonator 121. For example, a Q-factor of the target resonator 121 may be determined based on setting of the resonance bandwidth of the target resonator 121 and/or setting of the impedance matching frequency of the target resonator 121.

The target unit 125 may be configured to transfer the received resonance power to the device or load. The target unit 125 may include an AC/DC converter and a DC/DC converter. The AC/DC converter may generate a DC voltage by rectifying an AC signal transmitted from the source resonator 115 to the target resonator 121. And the DC/DC converter may supply a rated voltage to a device or the load by adjusting the voltage level of the DC voltage.

In one or more embodiments, the source resonator 115 and the target resonator 121 may be configured as a helix coil structured resonator, a spiral coil structured resonator, a meta-structured resonator, or the like.

Referring to FIG. 1, controlling the Q-factor may include setting the resonance bandwidth of the source resonator 115 and the resonance bandwidth of the target resonator 121, and transferring the electromagnetic energy from the source resonator 115 to the target resonator 121 through magnetic coupling 101 between the source resonator 115 and the target resonator 121. The resonance bandwidth of the source resonator 115 may be set to be wider or narrower than the resonance bandwidth of the target resonator 121 in some instances. For example, an unbalanced relationship between a BW-factor of the source resonator 115 and a BW-factor of the target resonator 121 may be maintained by setting the resonance bandwidth of the source resonator 115 to be wider or narrower than the resonance bandwidth of the target resonator 121.

For wireless power transmission employing a resonance scheme, the resonance bandwidth may be an important factor. When the Q-factor (e.g., considering a change in a distance between the source resonator 115 and the target resonator 121, a change in the resonance impedance, impedance mismatching, a reflected signal, and/or the like), is $Q_r$, $Q_t$ may have an inverse-proportional relationship with the resonance bandwidth, as given by Equation 1.

$$\frac{\Delta f}{f_0} = \frac{1}{Qt} \qquad \text{[Equation 1]}$$

$$= \Gamma_{S,D} + \frac{1}{BW_S} + \frac{1}{BW_D}$$

In Equation 1, $f_0$ denotes a central frequency, $\Delta f$ denotes a change in a bandwidth, $\Gamma_{S,D}$ denotes a reflection loss between the source resonator 115 and the target resonator 121, $BW_S$ denotes the resonance bandwidth of the source resonator 115, and $BW_D$ denotes the resonance bandwidth of the target resonator 121. The BW-factor may indicate either $1/BW_S$ or $1/BW_D$.

Due to one or more external effects, for example, a change in the distance between the source resonator 115 and the target resonator 121, a change in a location of at least one of the source resonator 115 and the target resonator 121, and/or the like, impedance mismatching between the source resonator 115 and the target resonator 121 may occur. The impedance mismatching may be a direct cause in decreasing an efficiency of power transfer. When a reflected wave corresponding to a transmission signal that is partially reflected and returned is detected, the matching control 113 may be configured to determine the impedance mismatching has occurred, and may perform impedance matching. The matching control 113 may change a resonance frequency by detecting a resonance point through a waveform analysis of the reflected wave. The matching control 113 may determine, as the resonance frequency, a frequency having the minimum amplitude in the waveform of the reflected wave.

The source resonator 115 and/or the target resonator 121 in FIG. 1 may have a resonator structure as illustrated in FIGS. 8 through 14.

As used herein, "fundamental resonance power" refers to resonance power of a fundamental band and "harmonic resonance power" refers to resonance power of a harmonic band. Also, as used herein, the term "multi-band" refers to multiple bands.

Figure 2:
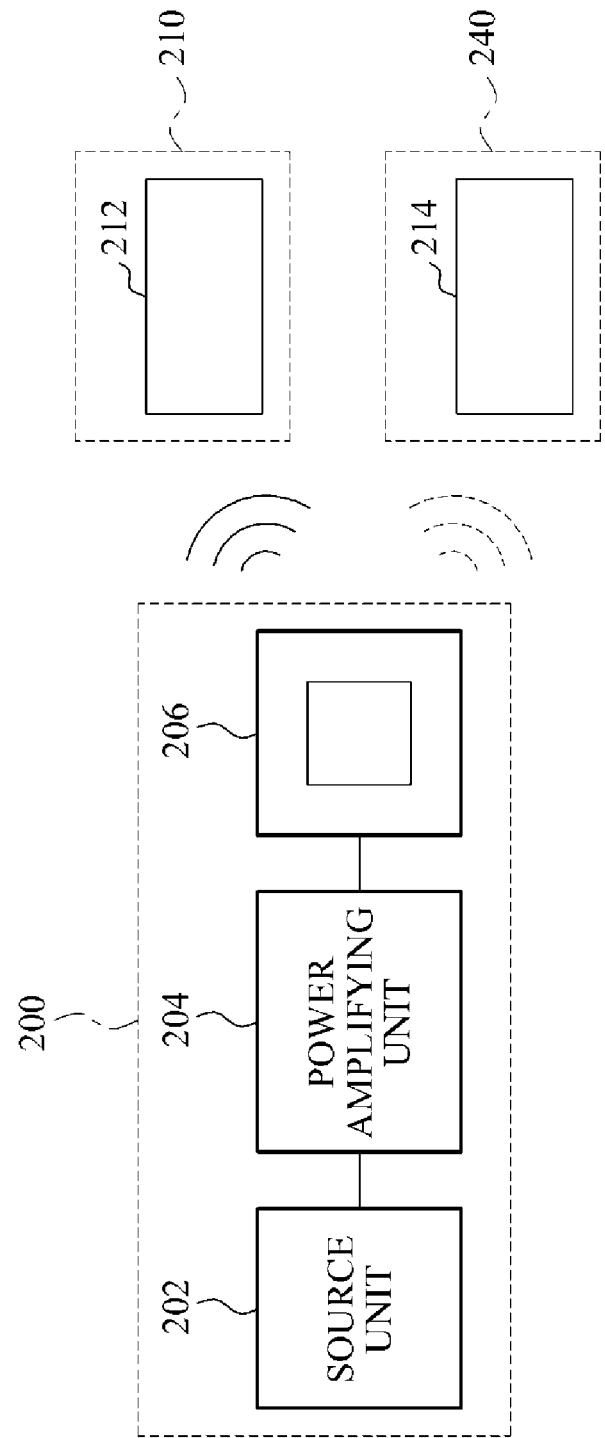
FIG. 2 is a diagram illustrating a wireless power transmission system that transmits resonance power using multiple bands.

FIG. 2 illustrates a wireless power transmission system that transmits resonance power using multiple bands. The wireless power transmitted through the wireless power transmission system may be resonance power.

The wireless power transmission system may correspond to a source-target structure including a source and a target. The wireless power transmission system may include a wireless power transmitter 200 corresponding to the source and wireless power receivers 210 and 220 corresponding to the target.

As shown, the wireless power transmitter 200 may include a source unit 202, a power amplifying unit 204, and a multi-band resonance unit 206.

The source unit 202 may receive energy to generate resonance power, and may transmit the resonance power to the power amplifying unit 204.

The power amplifying unit 204 may amplify the resonance power received from the source unit 202, and may transmit the amplified resonance power to the multi-band resonance unit 206.

Figure 3:
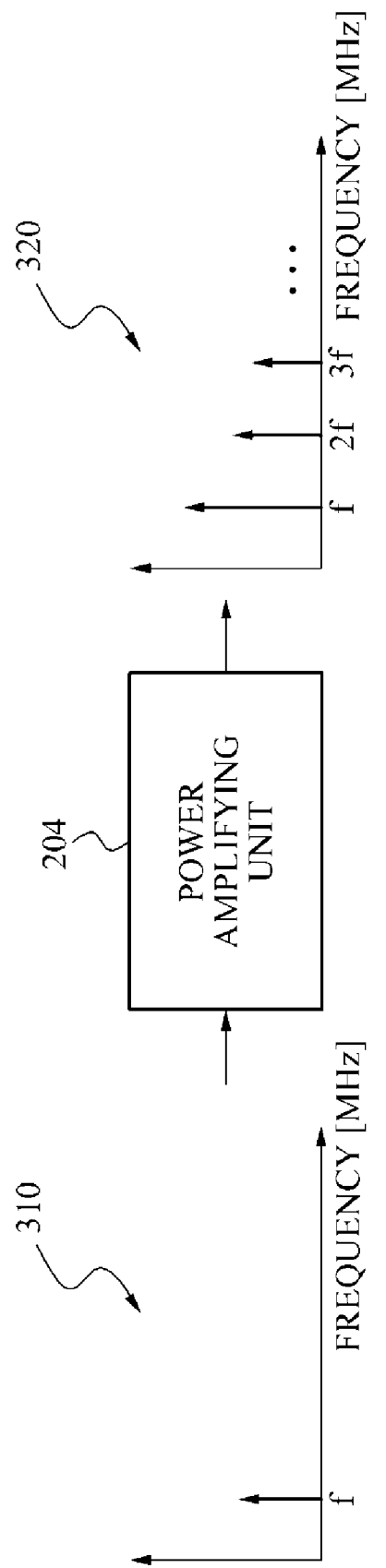
FIG. 3 is a diagram illustrating harmonic resonance power that generated by a power amplifying unit that is associated with a harmonic band.

FIG. 3 illustrates harmonic resonance power generated by the power amplifying unit 204 that is associated with a harmonic band. Referring to FIG. 3, the power amplifying unit 204 may be configured to amplify a resonance power 310 and to output the amplified resonance power 320. In one or more embodiments, the power amplifying unit 204 may include a non-linear element.

The amplified resonance power 320 may include fundamental resonance power of a fundamental band and harmonic resonance power of a harmonic band. The harmonic resonance power may be generated during the amplification. In some instances, the harmonic resonance power of the harmonic band may have relatively lower power than the fundamental resonance power.

Figure 4:
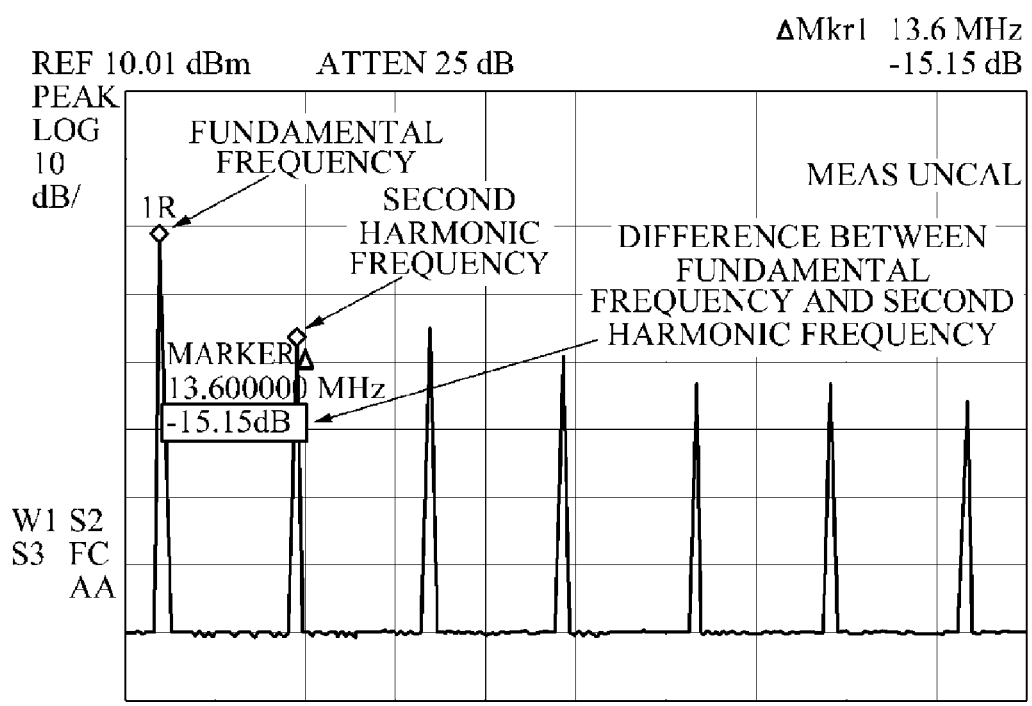
FIG. 4 is a diagram illustrating a spectrum measurement result of a 200 W power amplifying unit.

FIG. 4 illustrates a spectrum analysis measurement result of a 200 W power amplifying unit. When the 200 W power amplifying unit receives an input signal of 13.6 MHz, it may output fundamental resonance power of 13.6 MHz as a fundamental band, a signal of 27.2 MHz as a second harmonic band, and so forth for additional harmonic frequencies. For example, the power difference between the fundamental band and the second harmonic band may be about 15.15 dB.

The multi-band resonance unit 206 may include at least two resonators transmitting the amplified resonance power to target resonators using different resonance bands. In one or more embodiments, one band may be used for each target resonator.

Figure 5:
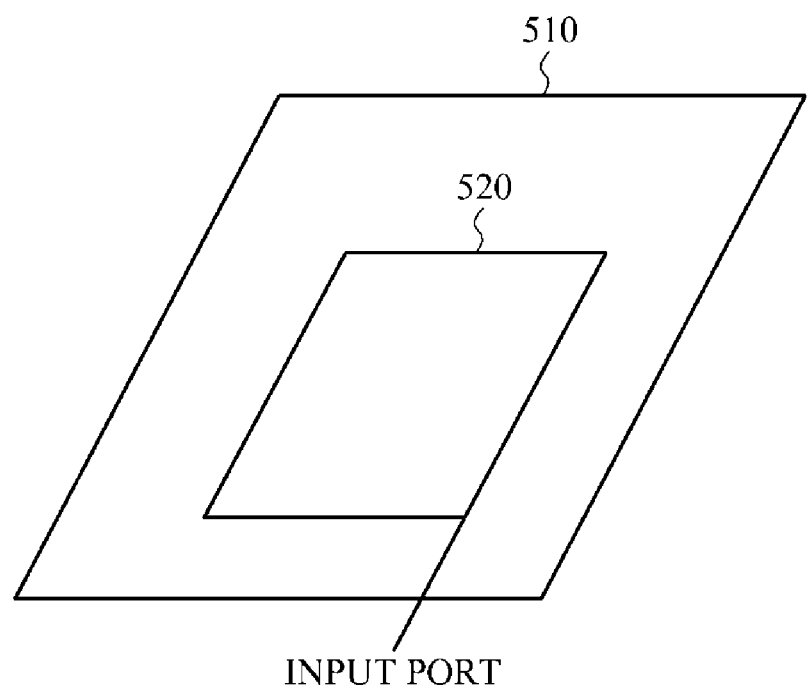
FIG. 5 is a diagram illustrating a multi-band resonance unit.

FIG. 5 illustrates one embodiment of the multi-band resonance unit 206.

As shown, the multi-band resonance unit 206 may be configured as a multiple loop structure that includes a fundamental resonator 510 and a harmonic resonator 520. The fundamental resonator 510 may be configured as a loop structure that transmits a fundamental resonance power of a fundamental band to a first target resonator 212. And the harmonic resonator 520 may be configured as a loop structure that transmits a harmonic resonance power of a harmonic band to a second target resonator 214. In one or more embodiments, the fundamental resonator 510, the harmonic resonator 520, the first target resonator 212, and the second target resonator 214 may have resonance structures of FIGS. 8 through 14.

Figure 6:
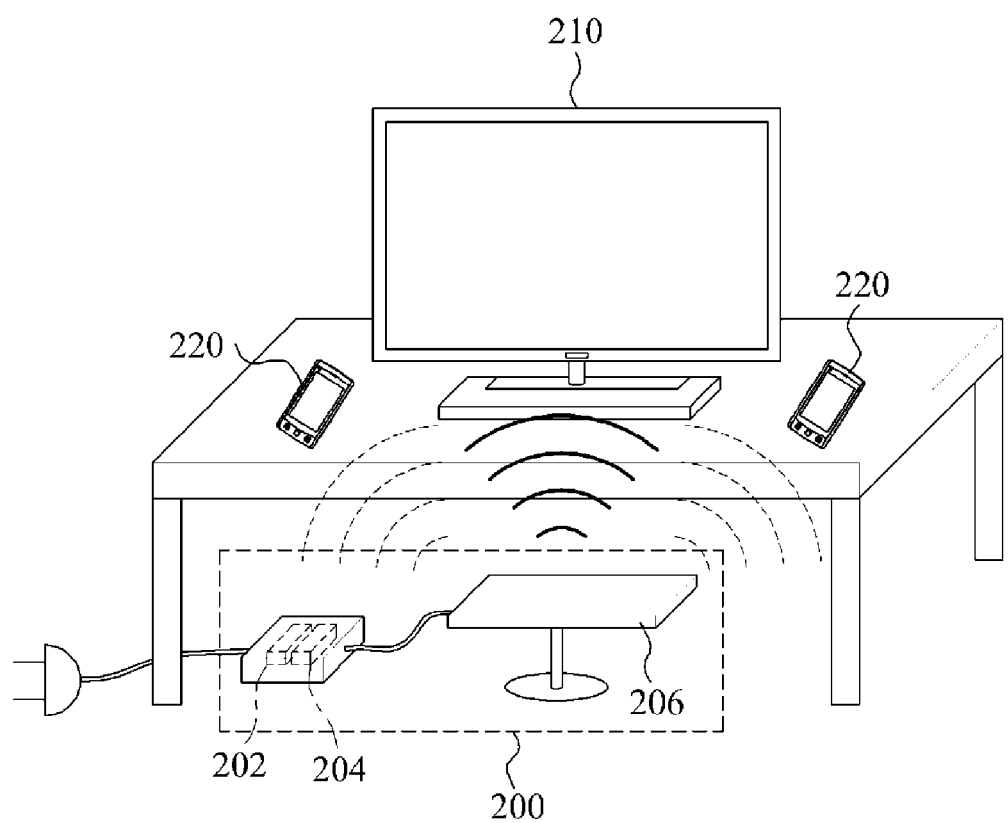
FIG. 6 is a diagram illustrating applying a wireless power transmission system.

FIG. 6 illustrates applying the wireless power transmission system.

Referring to FIG. 6, the wireless power transmitter 200 may transmit a fundamental resonance power of a fundamental band and a harmonic resonance power of a harmonic band, using the multi-band resonance unit 206. The wireless power receiver 210 may correspond to a high power receiver, such as a television (TV) and/or the like, which may be provided with fundamental resonance power. On the other hand, the wireless power receiver 240 may correspond to a low power receiver, such as a mobile phone or the like which may be provided with harmonic resonance power of a second, third or other harmonic band. Even though the wireless power receiver 210 and the wireless power receiver 240 may be positioned close to each other in the wireless power transmission system as illustrated in FIG. 6, the wireless power receivers 210 and 240 may receive resonance power via different resonance bands and thus, may be provided with a wireless power without significant interference.

Figure 7:
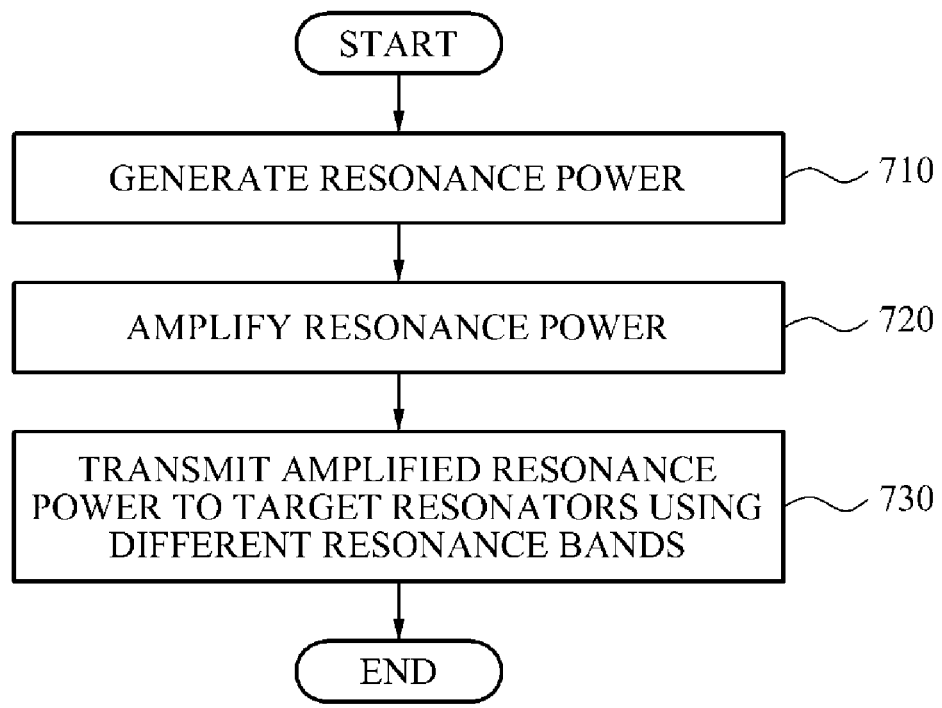
FIG. 7 is a diagram illustrating a wireless power transmitter that transmits resonance power using multiple bands.

FIG. 7 illustrates a method of using a wireless power transmitter 200 that transmits a resonance power using a multiple band in the wireless power transmission system.

In operation 710, the wireless power transmitter 200 may receive energy to generate a resonance power.

Next, in operation 720, the wireless power transmitter 200 may be configured to amplify the resonance power. For example, the wireless power transmitter 200 may amplify the resonance power to a fundamental resonance power of a fundamental band, and a harmonic resonance power of at least one harmonic band may be generated during the amplification.

In operation 730, the wireless power transmitter 200 may transmit the amplified resonance power to target resonators using different resonance bands. The wireless power transmitter 200 may transmit, via the fundamental resonator 510, the fundamental power transmitter of the fundamental band to the first target resonator 212, and may transmit, via the harmonic resonator 520, the harmonic resonance power of the harmonic band to the second target resonator 214.

Referring again to FIG. 1, the source resonator 115 and/or the target resonator 121 may be configured as a helix coil structured resonator, a spiral coil structured resonator, a meta-structured resonator, and the like.

An electromagnetic characteristic of many materials found in nature is that they have a unique magnetic permeability or a unique permittivity. Most materials typically have a positive magnetic permeability or a positive permittivity. Thus, for these materials, a right hand rule may be applied to an electric field, a magnetic field, and a pointing vector and thus, the corresponding materials may be referred to as right handed materials (RHMs).

On the other hand, a material having a magnetic permeability or a permittivity which is not ordinarily found in nature or is artificially-designed (or man-made) may be referred to herein as a "metamaterial." Metamaterials may be classified into an epsilon negative (ENG) material, a mu negative (MNG) material, a double negative (DNG) material, a negative refractive index (NRI) material, a left-handed (LH) material, and the like, based on a sign of the corresponding permittivity or magnetic permeability.

The magnetic permeability may indicate a ratio between a magnetic flux density occurring with respect to a given magnetic field in a corresponding material and a magnetic flux density occurring with respect to the given magnetic field in a vacuum state. The permittivity indicates a ratio between an electric flux density occurring with respect to a given electric field in a corresponding material and an electric flux density occurring with respect to the given electric field in a vacuum state. The magnetic permeability and the permittivity may determine a propagation constant of a corresponding material in a given frequency or a given wavelength. An electromagnetic characteristic of the corresponding material may be determined based on the magnetic permeability and the permittivity. According to an aspect, the metamaterial may be easily disposed in a resonance state without significant material size changes. This may be practical for a relatively large wavelength area or a relatively low frequency area.

FIG. 8 through FIG. 14 illustrate various resonator structures.

Figure 8:
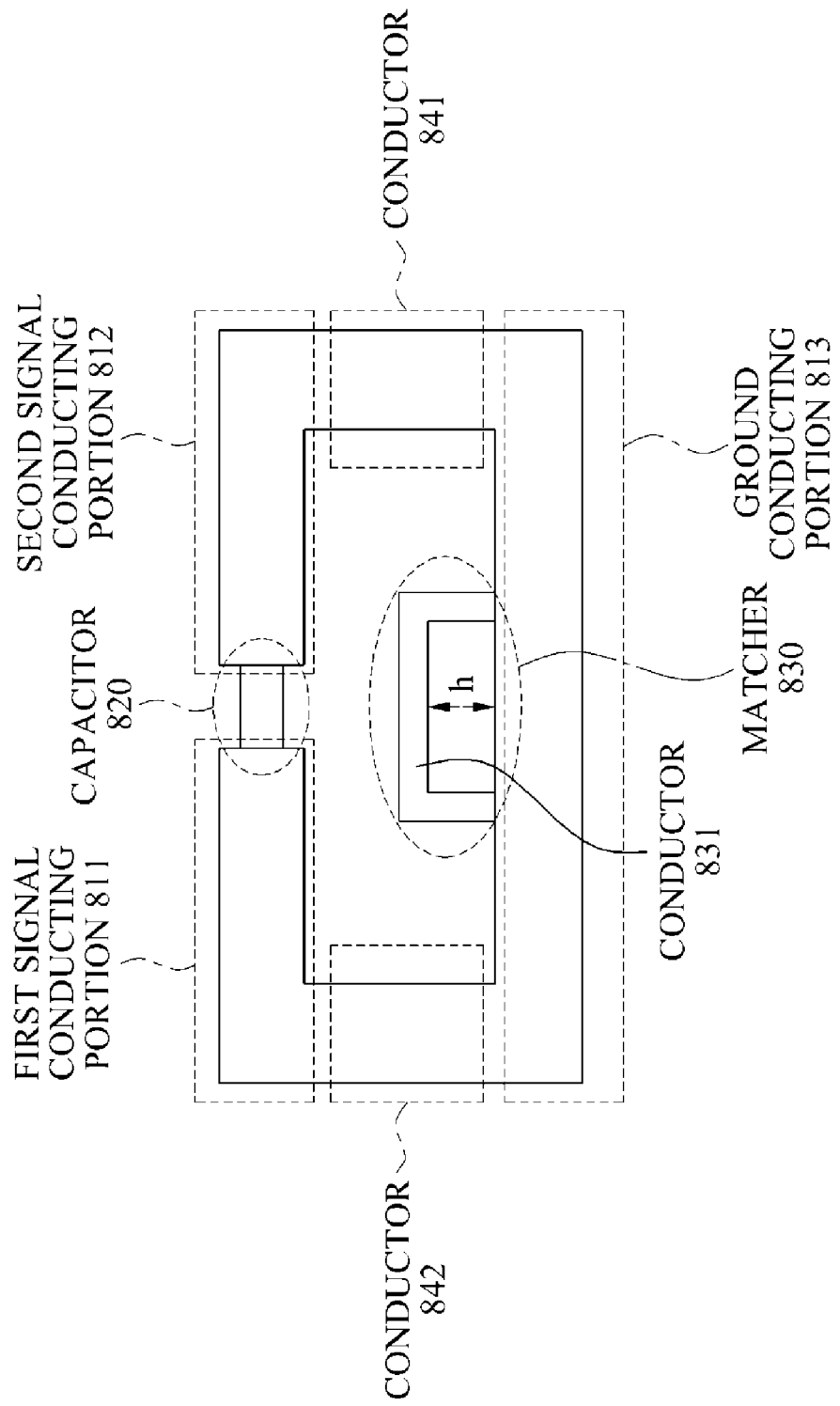

FIG. 8 illustrates a resonator 800 having a two-dimensional (2D) structure.

As shown, the resonator 800 having the 2D structure may include a transmission line, a capacitor 820, a matcher 830, and conductors 841 and 842. The transmission line may include, for instance, a first signal conducting portion 811, a second signal conducting portion 812, and a ground conducting portion 813.

The capacitor 820 may be inserted or otherwise positioned in series between the first signal conducting portion 811 and the second signal conducting portion 812 so that an electric field may be confined within the capacitor 820. In various implementations, the transmission line may include at least one conductor in an upper portion of the transmission line, and may also include at least one conductor in a lower portion of the transmission line. Current may flow through the at least one conductor disposed in the upper portion of the transmission line and the at least one conductor disposed in the lower portion of the transmission may be electrically grounded. As shown in FIG. 8, the resonator 800 may be configured to have a generally 2D structure. The transmission line may include the first signal conducting portion 811 and the second signal conducting portion 812 in the upper portion of the transmission line, and may include the ground conducting portion 813 in the lower portion of the transmission line. As shown, the first signal conducting portion 811 and the second signal conducting portion 812 may be disposed to face the ground conducting portion 813 with current flowing through the first signal conducting portion 811 and the second signal conducting portion 812.

In some implementations, one end of the first signal conducting portion 811 may be electrically connected (i.e., shorted) to a conductor 842, and another end of the first signal conducting portion 811 may be connected to the capacitor 820. One end of the second signal conducting portion 812 may be grounded to the conductor 841, and another end of the second signal conducting portion 812 may be connected to the capacitor 820. Accordingly, the first signal conducting portion 811, the second signal conducting portion 812, the ground conducting portion 813, and the conductors 841 and 842 may be connected to each other such that the resonator 800 may have an electrically "closed-loop structure." The term "closed-loop structure" as used herein, may include a polygonal structure, for example, a circular structure, a rectangular structure, or the like that is, electrically closed. The capacitor 820 may be inserted into an intermediate portion of the transmission line. For instance, the capacitor 820 may be inserted into a space between the first signal conducting portion 811 and the second signal conducting portion 812. The capacitor 820 may be configured, in some instances, as a lumped element, a distributed element, and/or the like. For example, a distributed capacitor may be configured as a distributed element and may include zigzagged conductor lines and a dielectric material having a relatively high permittivity between the zigzagged conductor lines.

When the capacitor 820 is inserted into the transmission line, the resonator 800 may have a property of a metamaterial, as discussed above. For example, the resonator 800 may have a negative magnetic permeability due to the capacitance of the capacitor 820. If so, the resonator 800 may also be referred to as a mu negative (MNG) resonator. Various criteria may be applied to determine the capacitance of the capacitor 820. For example, the criteria for enabling the resonator 800 to have the characteristic of the metamaterial may include one or more of the following: a criterion for enabling the resonator 800 to have a negative magnetic permeability in a target frequency, a criterion for enabling the resonator 800 to have a zeroth order resonance characteristic in the target frequency, or the like.

The resonator 800, which may also be referred to as the MNG resonator 800, may also have a zeroth order resonance characteristic (i.e., having, as a resonance frequency, a frequency when a propagation constant is "0"). If the resonator 800 has a zeroth order resonance characteristic, the resonance frequency may be independent with respect to a physical size of the MNG resonator 800. Moreover, by appropriately designing (or configuring) the capacitor 820, the MNG resonator 800 may sufficiently change the resonance frequency without substantially changing, the physical size of the MNG resonator 800.

In a near field, for instance, the electric field may be concentrated on the capacitor 820 inserted into the transmission line. Accordingly, due to the capacitor 820, the magnetic field may become dominant in the near field. In one or more embodiments, the MNG resonator 800 may have a relatively high Q-factor using the capacitor 820 of the lumped element. Thus, it may be possible to enhance power transmission efficiency. For example, the Q-factor indicates a level of an ohmic loss or a ratio of a reactance with respect to a resistance in the wireless power transmission. The efficiency of the wireless power transmission may increase according to an increase in the Q-factor.

The MNG resonator 800 may include a matcher 830 for impedance-matching. The matcher 830 may be configured to appropriately determine and adjust the strength of the magnetic field of the MNG resonator 800. Depending on the configuration, current may flow in the MNG resonator 800 via a connector, or may flow out from the MNG resonator 800 via the connector. The connector may be connected to the ground conducting portion 813 or the matcher 830. In some instances, the power may be transferred through coupling without using a physical connection between the connector and the ground conducting portion 813 or the matcher 830.

As shown in FIG. 8, the matcher 830 may be positioned within the loop formed by the loop structure of the resonator 800. The matcher 830 may be configured to adjust the impedance of the resonator 800 by changing the physical shape of the matcher 830. For example, the matcher 830 may include the conductor 831 for the impedance-matching positioned in a location that is separate from the ground conducting portion 813 by a distance h. The impedance of the resonator 800 may be changed by adjusting the distance h.

In some instances, a controller may be provided to control the matcher 830 which generates and transmits a control signal to the matcher 830 directing the matcher to change its physical shape so that the impedance of the resonator may be adjusted. For example, the distance h between a conductor 831 of the matcher 830 and the ground conducting portion 813 may increase or decrease based on the control signal. The controller may generate the control signal based on various factors.

As shown in FIG. 8, the matcher 830 may be configured as a passive element such as the conductor 831, for example. Of course, in other embodiments, the matcher 830 may be configured as an active element such as a diode, a transistor, or the like. If the active element is included in the matcher 830, the active element may be driven based on the control signal generated by the controller, and the impedance of the resonator 800 may be adjusted based on the control signal. For example, when the active element is a diode included in the matcher 830, the impedance of the resonator 800 may be adjusted depending on whether the diode is in an ON state or in an OFF state.

In some instances, a magnetic core may be further provided to pass through the MNG resonator 800. The magnetic core may perform a function of increasing a power transmission distance.

Figure 9:
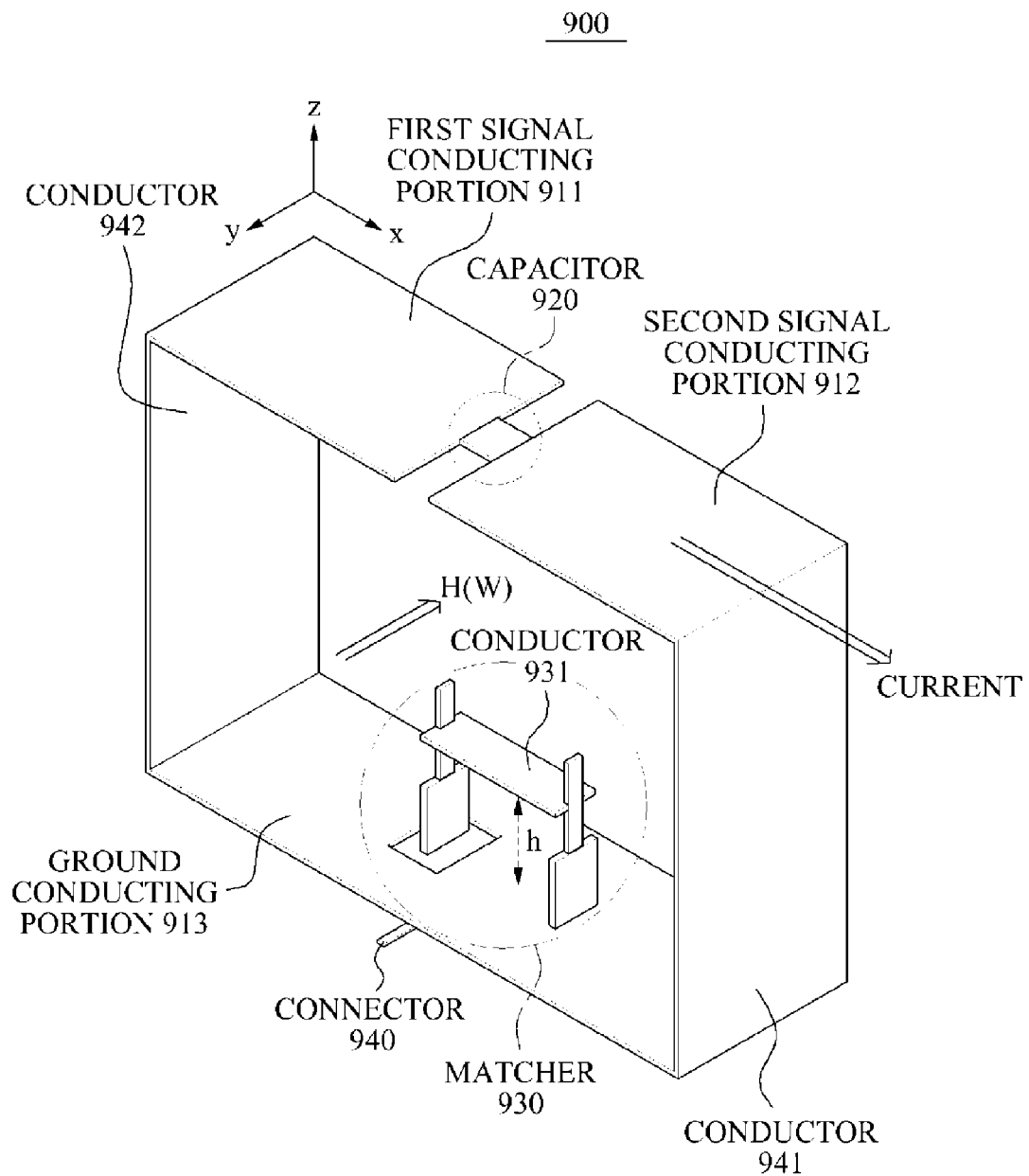

FIG. 9 illustrates a resonator 900 having a three-dimensional (3D) structure.

Referring to FIG. 9, the resonator 900 having the 3D structure may include a transmission line and a capacitor 920. The transmission line may include a first signal conducting portion 911, a second signal conducting portion 912, and a ground conducting portion 913. The capacitor 920 may be inserted, for instance, in series between the first signal conducting portion 911 and the second signal conducting portion 912 of the transmission link such that an electric field may be confined within the capacitor 920.

As shown in FIG. 9, the resonator 900 may have a generally 3D structure. The transmission line may include the first signal conducting portion 911 and the second signal conducting portion 912 in an upper portion of the resonator 900, and may include the ground conducting portion 913 in a lower portion of the resonator 900. The first signal conducting portion 911 and the second signal conducting portion 912 may be disposed to face the ground conducting portion 913. In this arrangement, current may flow in an x direction through the first signal conducting portion 911 and the second signal conducting portion 912. Due to the current, a magnetic field H(W) may be formed in a −y direction. However, it will be appreciated that the magnetic field H(W) might also be formed in other directions (e.g., a +y direction) in some implementations.

In one or more embodiments, one end of the first signal conducting portion 911 may be electrically connected (i.e., shorted) to a conductor 942, and another end of the first signal conducting portion 911 may be connected to the capacitor 920. One end of the second signal conducting portion 912 may be grounded to the conductor 941, and another end of the second signal conducting portion 912 may be connected to the capacitor 920. Accordingly, the first signal conducting portion 911, the second signal conducting portion 912, the ground conducting portion 913, and the conductors 941 and 942 may be connected to each other, whereby the resonator 900 may have an electrically closed-loop structure. As shown in FIG. 9, the capacitor 920 may be inserted or otherwise positioned between the first signal conducting portion 911 and the second signal conducting portion 912. For example, the capacitor 920 may be inserted into a space between the first signal conducting portion 911 and the second signal conducting portion 912. The capacitor 920 may be, for example, a lumped element, a distributed element, and the like. In one implementation, a distributed capacitor configured as a distributed element may include zigzagged conductor lines and a dielectric material having a relatively high permittivity between the zigzagged conductor lines. When the capacitor 920 is inserted into the transmission line, the resonator 900 may have a property of a metamaterial.

For example, when the capacitance of the capacitor configured as the lumped element is appropriately determined, the resonator 900 may have the characteristic of the metamaterial. And when the resonator 900 has a negative magnetic permeability by appropriately adjusting the capacitance of the capacitor 920, the resonator 900 may also be referred to as an MNG resonator. Various criteria may be applied to determine the capacitance of the capacitor 920. For example, the criteria may include one or more of the following: a criterion for enabling the resonator 900 to have the characteristic of the metamaterial, a criterion for enabling the resonator 900 to have a negative magnetic permeability in a target frequency, a criterion enabling the resonator 900 to have a zeroth order resonance characteristic in the target frequency, or the like. Based on at least one criterion among the aforementioned criteria, the capacitance of the capacitor 920 may be determined.

The resonator 900, which may also be referred to as the MNG resonator 900, may have a zeroth order resonance characteristic (i.e., having, as a resonance frequency, a frequency when a propagation constant is "0"). If the resonator 900 has a zeroth order resonance characteristic, the resonance frequency may be independent with respect to a physical size of the MNG resonator 900. Thus, by appropriately designing (or configuring) the capacitor 920, the MNG resonator 900 may sufficiently change the resonance frequency without changing the physical size of the MNG resonator 900.

Referring to the MNG resonator 900 of FIG. 9, in a near field, the electric field may be concentrated on the capacitor 920 inserted into the transmission line. Accordingly, due to the capacitor 920, the magnetic field may become dominant in the near field. And, since the MNG resonator 900 having the zeroth-order resonance characteristic may have characteristics similar to a magnetic dipole, the magnetic field may become dominant in the near field. A relatively small amount of the electric field formed due to the insertion of the capacitor 920 may be concentrated on the capacitor 920 and thus, the magnetic field may become further dominant.

Also, the MNG resonator 900 may include a matcher 930 for impedance-matching. The matcher 930 may be configured to appropriately adjust the strength of magnetic field of the MNG resonator 900. The impedance of the MNG resonator 900 may be determined by the matcher 930. In one or more embodiments, current may flow in the MNG resonator 900 via a connector 940, or may flow out from the MNG resonator 900 via the connector 940. And the connector 940 may be connected to the ground conducting portion 913 or the matcher 930.

As shown in FIG. 9, the matcher 930 may be positioned within the loop formed by the loop structure of the resonator 900. The matcher 930 may be configured to adjust the impedance of the resonator 900 by changing the physical shape of the matcher 930. For example, the matcher 930 may include the conductor 931 for the impedance-matching in a location separate from the ground conducting portion 913 by a distance h. The impedance of the resonator 900 may be changed by adjusting the distance h.

In some implementations, a controller may be provided to control the matcher 930. In this case, the matcher 930 may change the physical shape of the matcher 930 based on a control signal generated by the controller. For example, the distance h between the conductor 931 of the matcher 930 and the ground conducting portion 913 may be increased or decreased based on the control signal. Accordingly, the physical shape of the matcher 930 may be changed such that the impedance of the resonator 900 may be adjusted. The distance h between the conductor 931 of the matcher 930 and the ground conducting portion 913 may be adjusted using a variety of schemes. Alternatively or additionally, a plurality of conductors may be included in the matcher 930 and the distance h may be adjusted by adaptively activating one of the conductors. As another example, the distance h may be adjusted by adjusting the physical location of the conductor 931 up and down. For instance, the distance h may be controlled based on the control signal of the controller. The controller may generate the control signal using various factors. As shown in FIG. 9, the matcher 930 may be configured as a passive element such as the conductor 931, for instance. Of course, in other embodiments, the matcher 930 may be configured as an active element such as a diode, a transistor, or the like. When the active element is included in the matcher 930, the active element may be driven based on the control signal generated by the controller, and the impedance of the resonator 900 may be adjusted based on the control signal. For example, if the active element is a diode included in the matcher 930, the impedance of the resonator 900 may be adjusted depending on whether the diode is in an ON state or in an OFF state.

In some implementations, a magnetic core may be further provided to pass through the resonator 900 configured as the MNG resonator. The magnetic core may perform a function of increasing a power transmission distance.

Figure 10:
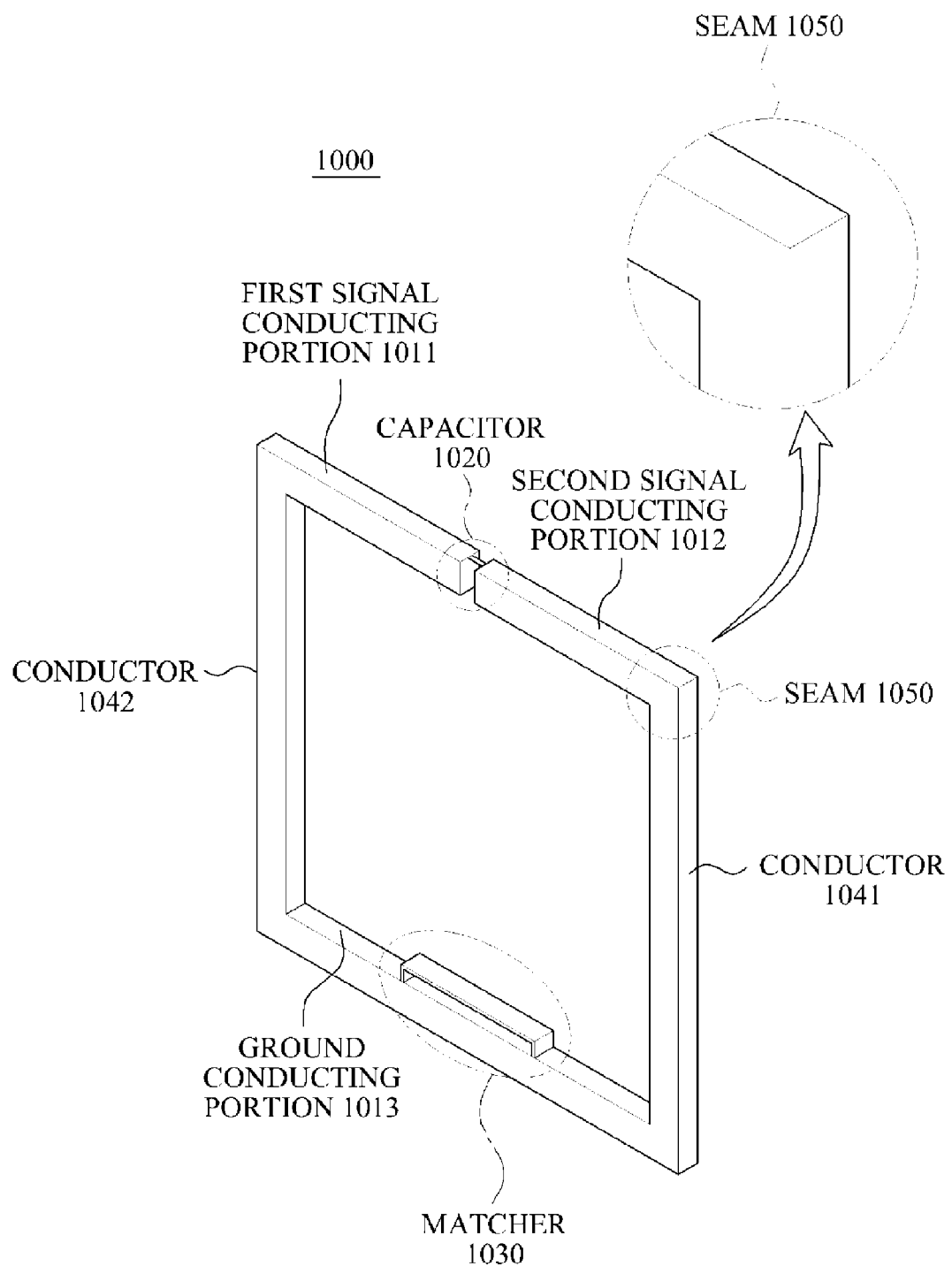

FIG. 10 illustrates a resonator 1000 for a wireless power transmission configured as a bulky type. As used herein, the term "bulky type" may refer to a seamless connection connecting at least two parts in an integrated form.

As shown, a first signal conducting portion 1011 and a conductor 1042 may be integrally formed instead of being separately manufactured and thereby be connected to each other. Similarly, the second signal conducting portion 1012 and a conductor 1041 may also be integrally manufactured.

When the second signal conducting portion 1012 and the conductor 1041 are separately manufactured and then are connected to each other, a loss of conduction may occur due to a seam 1050. Thus, in some implementations, the second signal conducting portion 1012 and the conductor 1041 may be connected to each other without using a separate seam (i.e., seamlessly connected to each other). Accordingly, it may be possible to decrease a conductor loss caused by the seam 1050. For instance, the second signal conducting portion 1012 and a ground conducting portion 1013 may be seamlessly and integrally manufactured. Similarly, the first signal conducting portion 1011, the conductor 1042 and the ground conducting portion 1013 may be seamlessly and integrally manufactured.

A matcher 1030 may be provided that is similarly constructed as described herein in one or more embodiments.

Figure 11:
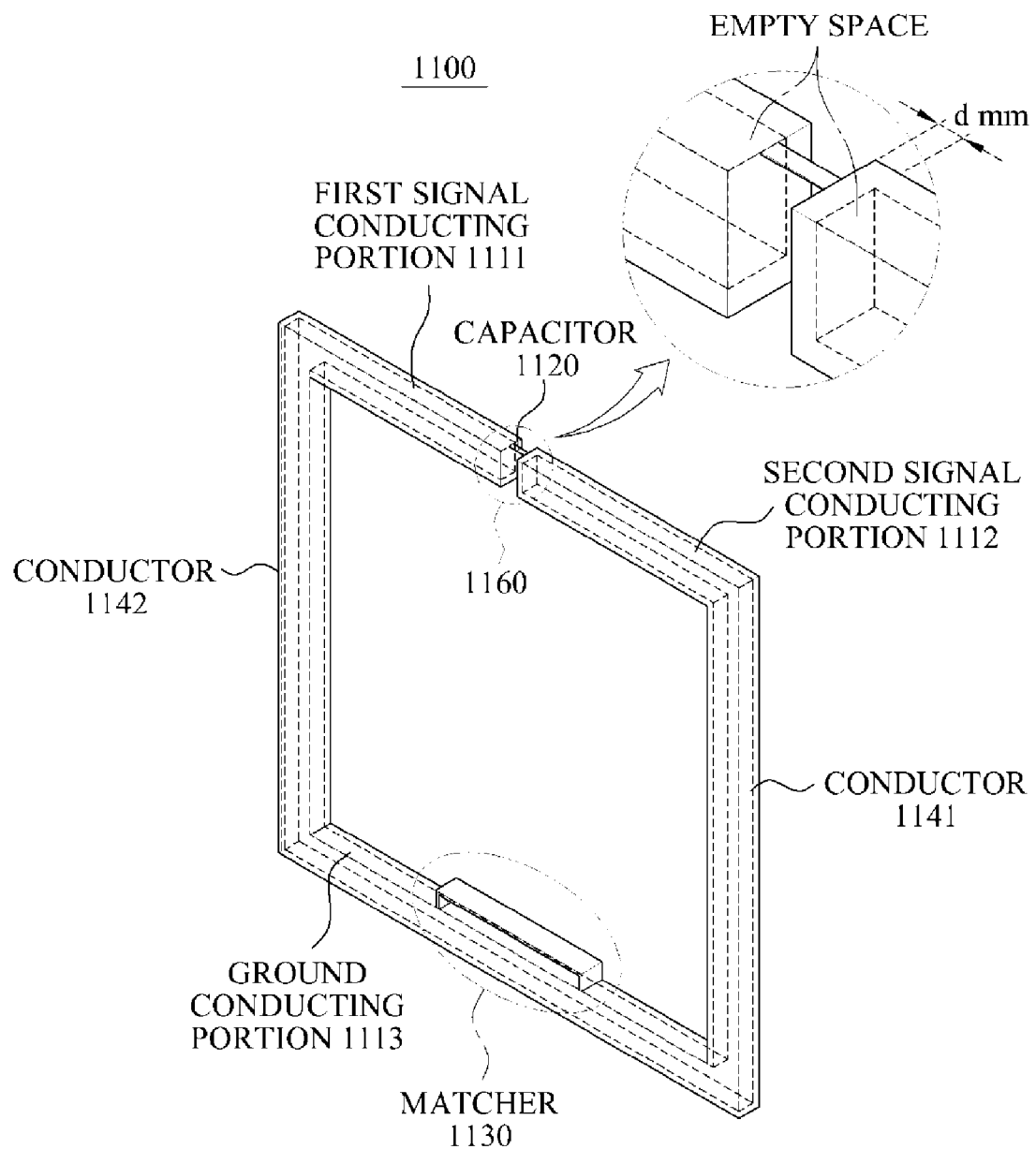

FIG. 11 illustrates a resonator 1100 for a wireless power transmission, configured as a hollow type.

Referring to FIG. 11, one or more of a first signal conducting portion 1111, a second signal conducting portion 1112, a ground conducting portion 1113, and conductors 1141 and 1142 of the resonator 1100 configured as the hollow type structure. As used herein the term "hollow type" refers to a configuration that may include an empty space inside.

For a given resonance frequency, an active current may be modeled to flow in only a portion of the first signal conducting portion 1111 instead of all of the first signal conducting portion 1111, a portion of the second signal conducting portion 1112 instead of all of the second signal conducting portion 1112, a portion of the ground conducting portion 1113 instead of all of the ground conducting portion 1113, and a portion of the conductors 1141 and 1142 instead of all of the conductors 1141 and 1142. When a depth of each of the first signal conducting portion 1111, the second signal conducting portion 1112, the ground conducting portion 1113, and the conductors 1141 and 1142 is significantly deeper than a corresponding skin depth in the given resonance frequency, it may be ineffective. The significantly deeper depth may, however, increase the weight or the manufacturing costs of the resonator 1100 in some instances.

Accordingly, for the given resonance frequency, the depth of one or more of the first signal conducting portion 1111, the second signal conducting portion 1112, the ground conducting portion 1113, and the conductors 1141 and 1142 may be appropriately determined based on the corresponding skin depth of each of the first signal conducting portion 1111, the second signal conducting portion 1112, the ground conducting portion 1113, and the conductors 1141 and 1142. When each of the first signal conducting portion 1111, the second signal conducting portion 1112, the ground conducting portion 1113, and the conductors 1141 and 1142 has an appropriate depth deeper than a corresponding skin depth, the resonator 1100 may become lighter, and manufacturing costs of the resonator 1100 may also decrease.

For example, as shown in FIG. 11, the depth of the second signal conducting portion 1112 (as further illustrated in the enlarged view region 1160 indicated by a circle) may be determined as "d" mm and d may be determined according to $$d = \frac{1}{\sqrt{\pi f \mu \sigma}}$$

Here, f denotes a frequency, μ denotes a magnetic permeability, and σ denotes a conductor constant. In one embodiment, when the first signal conducting portion 1111, the second signal conducting portion 1112, the ground conducting portion 1113, and the conductors 1141 and 1142 are made of a copper and they may have a conductivity of $5.8 \times 10^7$ siemens per meter (S·m−1), the skin depth may be about 0.6 mm with respect to 10 kHz of the resonance frequency and the skin depth may be about 0.006 mm with respect to 100 MHz of the resonance frequency.

A capacitor 1120 and a matcher 1130 may be provided that are similarly constructed as described herein in one or more embodiments.

Figure 12:
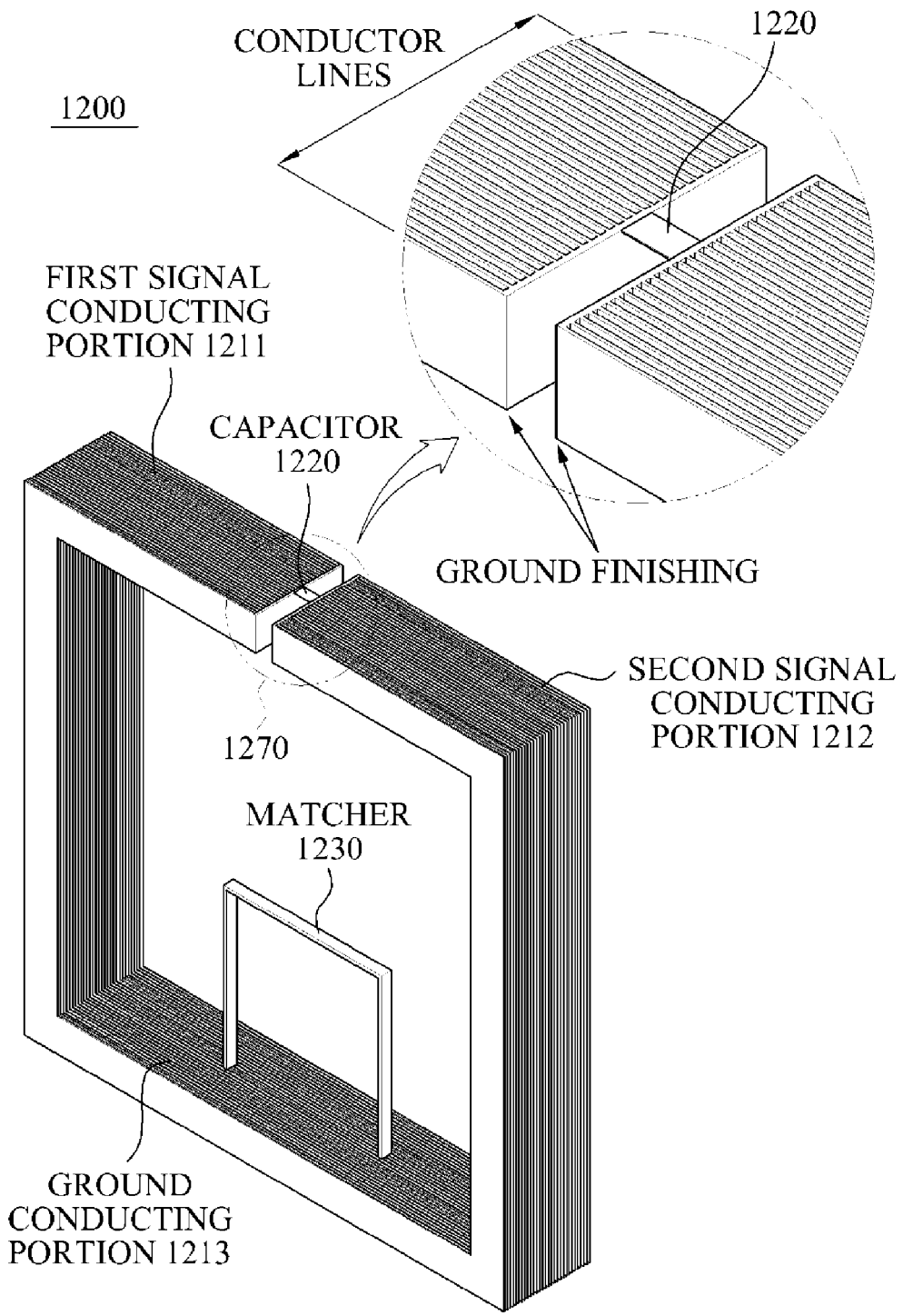

FIG. 12 illustrates a resonator 1200 for a wireless power transmission using a parallel-sheet.

Referring to FIG. 12, the parallel-sheet may be applicable to each of a first signal conducting portion 1211 and a second signal conducting portion 1212 included in the resonator 1200.

One or both of the first signal conducting portion 1211 and the second signal conducting portion 1212 may not be a perfect conductor and thus, may have an inherent resistance. Due to this resistance, an ohmic loss may occur. The ohmic loss may decrease a Q-factor and also decrease a coupling effect.

By applying the parallel-sheet to the first signal conducting portion 1211 and the second signal conducting portion 1212, it may be possible to decrease the ohmic loss, and to increase the Q-factor and the coupling effect. Referring to the enlarged view portion 1270 indicated by a circle, when the parallel-sheet is applied, each of the first signal conducting portion 1211 and the second signal conducting portion 1212 may include a plurality of conductor lines. The plurality of conductor lines may be disposed in parallel, and may be electrically connected (i.e., shorted) at an end portion of each of the first signal conducting portion 1211 and the second signal conducting portion 1212.

When the parallel-sheet is applied to each of the first signal conducting portion 1211 and the second signal conducting portion 1212, the plurality of conductor lines may be disposed in parallel. Accordingly, a sum of resistances having the conductor lines may decrease. Consequently, the resistance loss may decrease, and the Q-factor and the coupling effect may increase.

A capacitor 1220 and a matcher 1230 positioned on the ground conducting portion 1213 may be provided that are similarly constructed as described herein in one or more embodiments.

FIG. 13 illustrates a resonator 1300 for a wireless power transmission, including a distributed capacitor.

Referring to FIG. 13, a capacitor 1320 included in the resonator 1300 is configured for the wireless power transmission. A capacitor as a lumped element may have a relatively high equivalent series resistance (ESR). A variety of schemes have been proposed to decrease the ESR contained in the capacitor of the lumped element. According to an embodiment, by using the capacitor 1320 as a distributed element, it may be possible to decrease the ESR. As will be appreciated, a loss caused by the ESR may decrease a Q-factor and a coupling effect.

As shown in FIG. 13, the capacitor 1320 may be configured as a conductive line having the zigzagged structure.

By employing the capacitor 1320 as the distributed element, it is possible to decrease the loss occurring due to the ESR in some instances. In addition, by disposing a plurality of capacitors as lumped elements, it may be possible to decrease the loss occurring due to the ESR. Since a resistance of each of the capacitors as the lumped elements decreases through a parallel connection, active resistances of parallel-connected capacitors as the lumped elements may also decrease whereby the loss occurring due to the ESR may decrease. For example, by employing ten capacitors of 1 pF each instead of using a single capacitor of 10 pF, it may be possible to decrease the loss occurring due to the ESR in some instances.

Figure 14A:
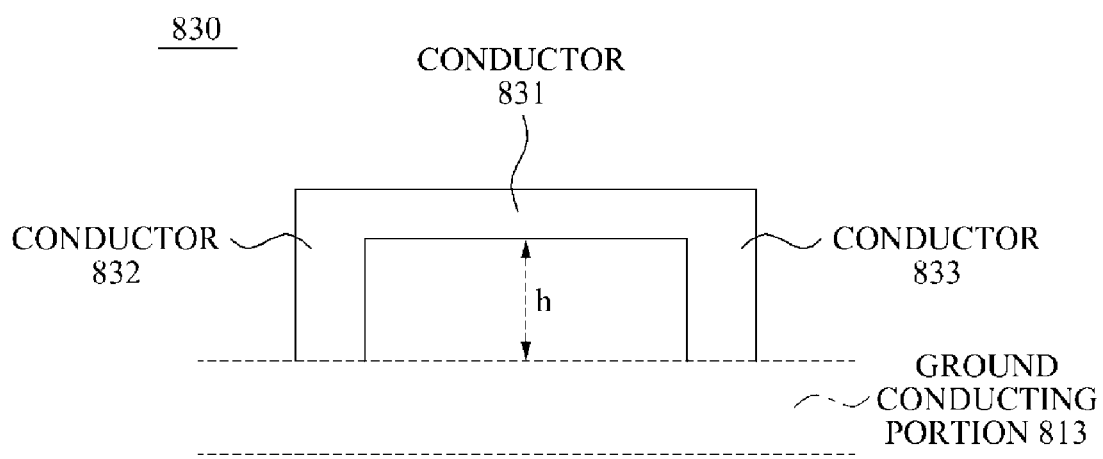
Figure 14B:
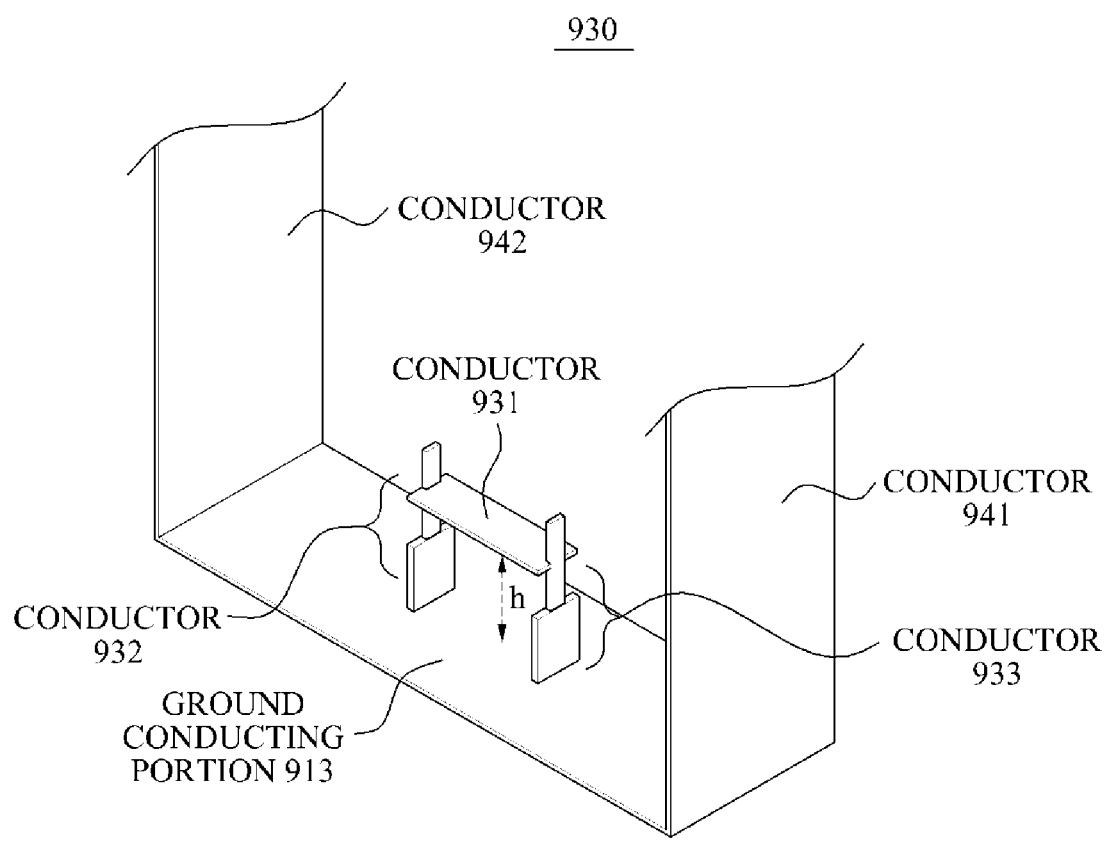

FIG. 14A illustrates one embodiment of the matcher 830 used in the resonator 800 provided in the 2D structure of FIG. 8, and FIG. 14B illustrates one embodiment of the matcher 930 used in the resonator 900 provided in the 3D structure of FIG. 9.

FIG. 14A illustrates a portion of the 2D resonator including the matcher 830, and FIG. 14B illustrates a portion of the 3D resonator of FIG. 9 including the matcher 930.

Referring to FIG. 14A, the matcher 830 may include the conductor 831, a conductor 832, and a conductor 833. The conductors 832 and 833 may be connected to the ground conducting portion 813 and the conductor 831. The impedance of the 2D resonator may be determined based on a distance h between the conductor 831 and the ground conducting portion 813, for instance. The distance h between the conductor 831 and the ground conducting portion 813 may be controlled by the controller. The distance h between the conductor 831 and the ground conducting portion 813 may be adjusted using a variety of schemes. For example, the schemes may include one or more of the following: a scheme of adjusting the distance h by adaptively activating one of the conductors 831, 832, and 833, a scheme of adjusting the physical location of the conductor 831 up and down, or the like.

Referring to FIG. 14B, the matcher 930 may include the conductor 931, a conductor 932, a conductor 933 and conductors 941 and 942. The conductors 932 and 933 may be connected to the ground conducting portion 913 and the conductor 931. The conductors 932 and 933 may be connected to the ground conducting portion 913 and the conductor 931. The impedance of the 3D resonator may be determined based on a distance h between the conductor 931 and the ground conducting portion 913. The distance h between the conductor 931 and the ground conducting portion 913 may be controlled by the controller, for example. Similar to the matcher 830 included in the 2D structured resonator, in the matcher 930 included in the 3D structured resonator, the distance h between the conductor 931 and the ground conducting portion 913 may be adjusted using a variety of schemes. For example, the schemes may include one or more of the following: a scheme of adjusting the distance h by adaptively activating one of the conductors 931, 932, and 933, a scheme of adjusting the physical location of the conductor 931 up and down, or the like.

In some implementations, the matcher may include an active element. Thus, a scheme of adjusting an impedance of a resonator using the active element may be similar as described above. For example, the impedance of the resonator may be adjusted by changing a path of a current flowing through the matcher using the active element.

Figure 15:
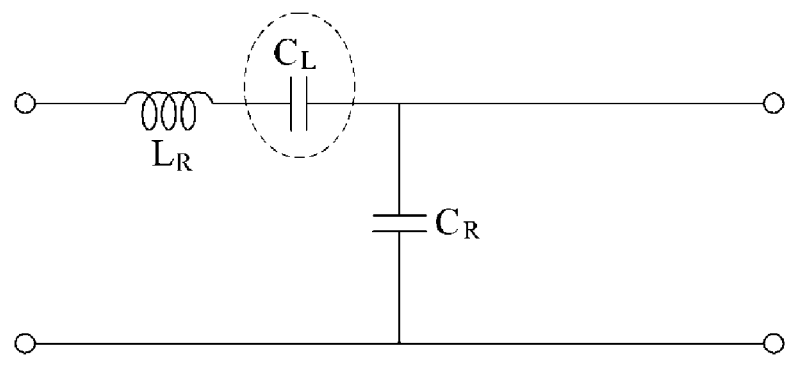
FIG. 15 is a diagram illustrating one equivalent circuit of a resonator for the wireless power transmitter of FIG. 8.

FIG. 15 illustrates one equivalent circuit of the resonator 800 for the wireless power transmission of FIG. 8.

The resonator 800 of FIG. 8 for the wireless power transmission may be modeled to the equivalent circuit of FIG. 15. In the equivalent circuit depicted in FIG. 15, $L_R$ denotes an inductance of the power transmission line, $C_L$ denotes the capacitor 820 that is inserted in a form of a lumped element in the middle of the power transmission line, and $C_R$ denotes a capacitance between the power transmissions and/or ground of FIG. 8.

In some instances, the resonator 800 may have a zeroth resonance characteristic. For example, when a propagation constant is "0", the resonator 800 may be assumed to have $\omega_{MZR}$ as a resonance frequency. The resonance frequency $\omega_{MZR}$ may be expressed by Equation 2.

$$\omega_{MZR} = \frac{1}{\sqrt{L_R C_L}} \quad \text{[Equation 2]}$$

In Equation 2, MZR denotes a Mu zero resonator.

Referring to Equation 2, the resonance frequency $\omega_{MZR}$ of the resonator 800 may be determined by $L_R/C_L$. A physical size of the resonator 800 and the resonance frequency $\omega_{MZR}$ may be independent with respect to each other. Since the physical sizes are independent with respect to each other, the physical size of the resonator 800 may be sufficiently reduced.

One or more embodiments may provide a wireless power transmitter that transmits a resonance power using a multi-band and a method thereof. In some embodiments, resonance power may be transmitted via the multi-band. Thus, wireless power receivers that receive the wireless power via different resonance bands may receive the resonance power without interference even though the wireless power receivers are close to each other. The wireless power transmitter may use a harmonic power naturally generated from a power amplifying unit as a resonance band for a wireless power receiver that is a low power wireless receiver and thus, waste of power may be reduced.

The units described herein may be implemented using hardware components and/or software components in various embodiments. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums. The computer readable recording medium may include any data storage device that can store data which can be thereafter read by a computer system or processing device. Examples of the computer readable recording medium include read-only memory (ROM), random-access memory (RAM), CD-ROMs, Magnetic tapes, floppy disks, optical data storage devices. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

A number of example embodiments have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A wireless power transmitter comprising:
a source unit configured to generate resonance power;
a power amplifying unit configured to amplify the resonance power to generate fundamental resonance power and harmonic resonance power; and
a multi-band resonance unit comprising at least two resonators configured to transmit the fundamental resonance power and the harmonic resonance power to respective target resonators simultaneously using different resonance bands.

2. The wireless power transmitter of claim 1, wherein:
the fundamental resonance power is of a fundamental band;
the harmonic resonance power is of a harmonic band; and
the at least two resonators comprise a fundamental resonator configured to transmit the fundamental resonance power to a first target resonator, and a harmonic resonator configured to transmit the harmonic resonance power to a second target resonator.

3. The wireless power transmitter of claim 1, wherein the harmonic resonance power is generated in response to the resonance power passing through the power amplifying unit that is a non-linear element.

4. The wireless power transmitter of claim 1, wherein the harmonic resonance power has lower power than the fundamental resonance power.

5. The wireless power transmitter of claim 1, wherein the at least two resonators comprise:
a fundamental resonator configured as a loop that transmits the fundamental resonance power of a fundamental band to a first target resonator; and
a harmonic resonator configured as a loop that transmits the harmonic resonance power of a harmonic band to a second target resonator.

6. The wireless power transmitter of claim 1, wherein the source unit is configured to receive energy to generate the resonance power.

7. The wireless power transmitter of claim 1, wherein the at least two resonators are configured to:
transmit the fundamental resonance power in a fundamental band; and
simultaneously transmit the harmonic resonance power in a harmonic band.

8. A method of transmitting a multi-band resonance power in a wireless power transmitter, the method comprising:
generating resonance power;
amplifying the resonance power to generate fundamental resonance power and, harmonic resonance power; and transmitting, to respective target resonators, the fundamental resonance power and the harmonic resonance power simultaneously using different resonance bands.

9. The method of claim 8, wherein:
the fundamental resonance power is of a fundamental band;
the harmonic resonance power is of a harmonic band; and
the transmitting comprises transmitting, using a fundamental resonator, the fundamental resonance power to a first target resonator, and transmitting, using a harmonic resonator, the harmonic resonance power to a second target resonator.

10. The method of claim 8, wherein the harmonic resonance power is generated in response to the resonance power passing through a power amplifying unit that is a non-linear element.

11. The method of claim 8, wherein the harmonic resonance power has lower power than the fundamental resonance power.

12. The method of claim 8, further comprising:
receiving energy to generate the resonance power.

13. A wireless power transmitter comprising:
an amplifier configured to amplify resonance power to generate fundamental resonance power and harmonic resonance power; and
a plurality of resonators configured to transmit the fundamental resonance power and the harmonic resonance power to respective target resonators simultaneously using different resonance bands.

14. The wireless power transmitter of claim 13, wherein the harmonic resonance power has lower power than the fundamental resonance power.

15. The wireless power transmitter of claim 13, wherein the plurality of resonators comprise:
a fundamental resonator configured to transmit the fundamental resonance power to a first target resonator; and
a harmonic resonator configured to transmit the harmonic resonance power to a second target resonator.

* * * * *